US012611749B2

(12) United States Patent
Gallegos de la Peña et al.

(10) Patent No.: US 12,611,749 B2
(45) Date of Patent: Apr. 28, 2026

(54) CLAMP WITH FIRST AND SECOND METAL LAYERS

(71) Applicant: Norma U.S. Holding LLC, Auburn Hills, MI (US)

(72) Inventors: Miguel Angel Gallegos de la Peña, Cd. Juarez (MX); David Reyes Lopez, Cd. Juarez (MX)

(73) Assignee: Norma U.S. Holding LLC, Auburn Hills, MI (US)

( * ) Notice: Subject to any disclaimer, the term of this patent is extended or adjusted under 35 U.S.C. 154(b) by 583 days.

(21) Appl. No.: 18/093,903

(22) Filed: Jan. 6, 2023

(65) Prior Publication Data

US 2023/0219197 A1     Jul. 13, 2023

Related U.S. Application Data

(60) Provisional application No. 63/297,292, filed on Jan. 7, 2022.

(51) Int. Cl.
*F16L 23/00* (2006.01)
*B25B 5/14* (2006.01)
(Continued)

(52) U.S. Cl.
CPC .............. *B25B 5/163* (2013.01); *B25B 5/147* (2013.01); *B32B 15/011* (2013.01); *F16L 23/10* (2013.01);
(Continued)

(58) Field of Classification Search
CPC . F16L 23/10; F16L 17/04; F16L 23/06; Y10T 24/1441; F16B 2/10; B25B 5/163; B25B 5/147; B32B 15/011; B32B 2307/30
(Continued)

(56) References Cited

U.S. PATENT DOCUMENTS 2,773,709 A * 12/1956 Smith ..................... F16L 23/10
285/367
2,773,710 A * 12/1956 Smith ..................... F16L 23/10
285/422
(Continued)

FOREIGN PATENT DOCUMENTS

CH          345209 A * 3/1960  .............. F16L 23/10
DE      2613954 A * 10/1977
(Continued)

OTHER PUBLICATIONS

Fastening Device; Patent Number: 2014105874; Document ID:JP 2014105874 A; Date Published: Jun. 9, 2014; Inventor: Jacques Billet; Application No. JP 2013244666 A; Date Filed: Nov. 27, 2013 (Year: 2014).*

(Continued)

*Primary Examiner* — Mahdi H Nejad
(74) *Attorney, Agent, or Firm* — REISING ETHINGTON, P.C.

(57) ABSTRACT

A clamp includes a closure mechanism and a band. The clamp can be a v-insert clamp. The band has a first metal layer and a second metal layer. The metal layers constitute a bi-metallic construction of the band. The metal layers can be composed of different stainless steel materials. The first metal layer possesses a first coefficient of thermal expansion, and the second metal layer possesses a second coefficient of thermal expansion. Values of the first coefficient of thermal expansion and of the second coefficient of thermal expansion differ relative to each other. The difference in value of the first and second coefficients of thermal expansion, and the position of the first and second metal layers relative to each other, can be effected in order to impart desired behavior of the band when experiencing a change in temperature.

19 Claims, 6 Drawing Sheets

(51) Int. Cl.

| | |
|---|---|
| *B25B 5/16* | (2006.01) |
| *B32B 15/01* | (2006.01) |
| *F16L 17/04* | (2006.01) |
| *F16L 23/10* | (2006.01) |
| *F16L 33/02* | (2006.01) |

(52) U.S. Cl.
CPC ........... *B32B 2307/30* (2013.01); *F16L 17/04*
(2013.01); *Y10T 24/1441* (2015.01)

(58) Field of Classification Search
USPC ..................... 285/367, 410, 411, 420; 24/279
See application file for complete search history.

(56) References Cited

U.S. PATENT DOCUMENTS

| | | | | |
|---|---|---|---|---|
| 5,026,096 A | * | 6/1991 | Lutz, II | F16L 21/002 |
| | | | | 285/373 |
| 5,873,611 A | * | 2/1999 | Munley | F16L 23/10 |
| | | | | 285/410 |
| 6,383,315 B1 | | 5/2002 | Kreipe et al. | |
| 7,520,539 B2 | * | 4/2009 | Ignaczak | F01N 13/1872 |
| | | | | 285/410 |
| 8,418,342 B2 | | 4/2013 | Dell et al. | |
| 2016/0208965 A1 | | 7/2016 | Draser et al. | |

FOREIGN PATENT DOCUMENTS

| | | | |
|---|---|---|---|
| EP | 2148991 | B1 | 2/2013 |
| JP | H11280971 | A | 10/1999 |
| JP | 2014105874 | A | 6/2014 |
| KR | 101215321 | B1 | 12/2012 |

OTHER PUBLICATIONS

International Preliminary Report On Patentability for International Application No. PCT/US2023/010278 dated Jun. 20, 2024 (6 pages).
International Search Report for International Application No. PCT/US2023/010278 dated Apr. 27, 2023 (3 pages).
Written Opinion for International Application No. PCT/US2023/010278 dated Apr. 27, 2023 (5 pages).

* cited by examiner 10, 112

116

CLAMP WITH FIRST AND SECOND METAL LAYERS

CROSS-REFERENCE TO RELATED APPLICATION

This application claims the benefit of U.S. Provisional Patent Application No. 63/297,292, with a filing date of Jan. 7, 2022, the contents of which are hereby incorporated by reference in their entirety.

TECHNICAL FIELD

This disclosure relates generally to clamps with bands composed of metal that are employed in use for joining pipes and hoses and other tubular bodies and lines together.

BACKGROUND

Clamps are used to join pipes and hoses and other tubular bodies and lines together in a fluid-tight manner. Clamps are employed in automotive applications, as well as aerospace, marine, industrial, and oil and gas applications, among others. Examples of clamps include v-insert clamps and pipe clamps. Bands of metal in a single sheet and of single material—usually stainless steel—typically constitute main structures of clamps and extend circumferentially around the tubular bodies being joined. Latch assemblies tighten and loosen the clamps and bands. When the clamps are tightened down on tubular bodies, for instance, radial and/or axial loads are exerted on the tubular bodies and furnish a fluid-tight joint between the tubular bodies.

SUMMARY

In an embodiment, a clamp may include a closure mechanism and a band. The closure mechanism has a bolt. The band has a first metal layer and a second metal layer. The first metal layer and the second metal layer are overlaid on each other. The first metal layer possesses a first coefficient of thermal expansion, and the second metal layer possesses a second coefficient of thermal expansion. The values of the first coefficient of thermal expansion and of the second coefficient of thermal expansion differ with respect to each other.

In an embodiment, a v-insert clamp may include a closure mechanism and a v-insert band. The closure mechanism has a bolt. The v-insert band has a first stainless steel layer and has a second stainless steel layer. The first stainless steel layer and the second stainless steel layer are overlaid on each other. The first stainless steel layer and the second stainless steel layer constitute the sole stainless steel layers of the v-insert band. The first stainless steel layer possesses a first coefficient of thermal expansion, and the second stainless steel layer possesses a second coefficient of thermal expansion. The first coefficient of thermal expansion differs in value with respect to the second coefficient of thermal expansion. The v-insert band has a pair of side walls. The v-insert band and pair of side walls establish a v-angle. When an increase of temperature occurs at the v-insert band at installation and use, the v-angle undergoes a change in value. The change in value may be an increase in value or may be a decrease in value.

In an embodiment, a v-insert clamp may include a closure mechanism and a v-insert band. The closure mechanism has a bolt. The v-insert band has a first stainless steel layer and has a second stainless steel layer. The first stainless steel layer and the second stainless steel layer possess material compositions that differ with respect to each other. The first stainless steel layer and the second stainless steel layer are overlaid on each other. The first stainless steel layer and the second stainless steel layer constitute the sole stainless steel layers of the v-insert band. The first stainless steel layer possesses a first coefficient of thermal expansion, and the second stainless steel layer possesses a second coefficient of thermal expansion. The first coefficient of thermal expansion differs in value with respect to the second coefficient of thermal expansion. The v-insert band has a pair of side walls. The v-insert band and pair of side walls establish a v-angle. When an increase of temperature occurs at the v-insert band at installation and use, the v-angle undergoes a decrease in value or undergoes an increase in value.

BRIEF DESCRIPTION OF THE DRAWINGS

Embodiments of the disclosure are described with reference to the appended drawings, in which.

DETAILED DESCRIPTION

With reference to the figures, embodiments of a clamp 10 are presented that have a band with a pair of metal layers. The metal layers constitute a bi-metallic construction of the band. A first of the metal layers possesses a coefficient of thermal expansion that differs in value with respect to a coefficient of thermal expansion of a second of the metal layers. The difference in value of the coefficients of thermal expansion of the bi-metallic construction—whether higher or lower—and the position of the metal layers relative to each other—whether inner or outer—can be controlled and managed in order to impart desired behavior of the band amid experiencing a change in temperature. In one embodiment, for instance, an axial load and/or radial load exerted by the band in installation and use of the clamp 10 is increased upon experiencing an increase in temperature. In another embodiment, an axial and/or radial load exerted by the band in installation and use of the clamp 10 does not decrease as much as past single-layer and single-metallic constructions upon experiencing an increase in temperature. This description presents the clamp 10 in the context of an automotive application (e.g., joints adjacent a turbocharger, exhaust manifold, etc., where such changes in temperature readily occur), but the clamp 10 has broader application and is suitable for use in aerospace, marine, industrial, and oil and gas applications, as well as others, and may find particular suitability in applications involving high temperatures and stringent leak demands; an industrial bulk material container and an industrial bypass filter unit are but two additionally specific applications for the sake of exemplary demonstration.

Furthermore, unless otherwise specified, the terms radially, axially, and circumferentially, and their grammatical variations, refer to directions with respect to the generally circular shape of the clamp 10 as illustrated in the figures. In this sense, axially refers to a direction that is generally along or parallel to a central axis CA (FIG. 1) of the circular shape, radially refers to a direction that is generally along or parallel to a radius of the circular shape, and circumferentially refers to a direction that is generally along or in a similar direction as a circumference of the circular shape.

As used herein, the term "clamp" is used expansively to refer to v-insert clamps, pipe clamps, couplers, and fasteners of various sorts that are employed to join metal pipes, hoses, and other tubular bodies and lines together and thereby establish a fluid-tight joint therebetween. A v-insert clamp, for example, secures flanged pipe ends and component ends together such as automotive exhaust pipes and components or engine pipes and components.

Figures 1, 2:
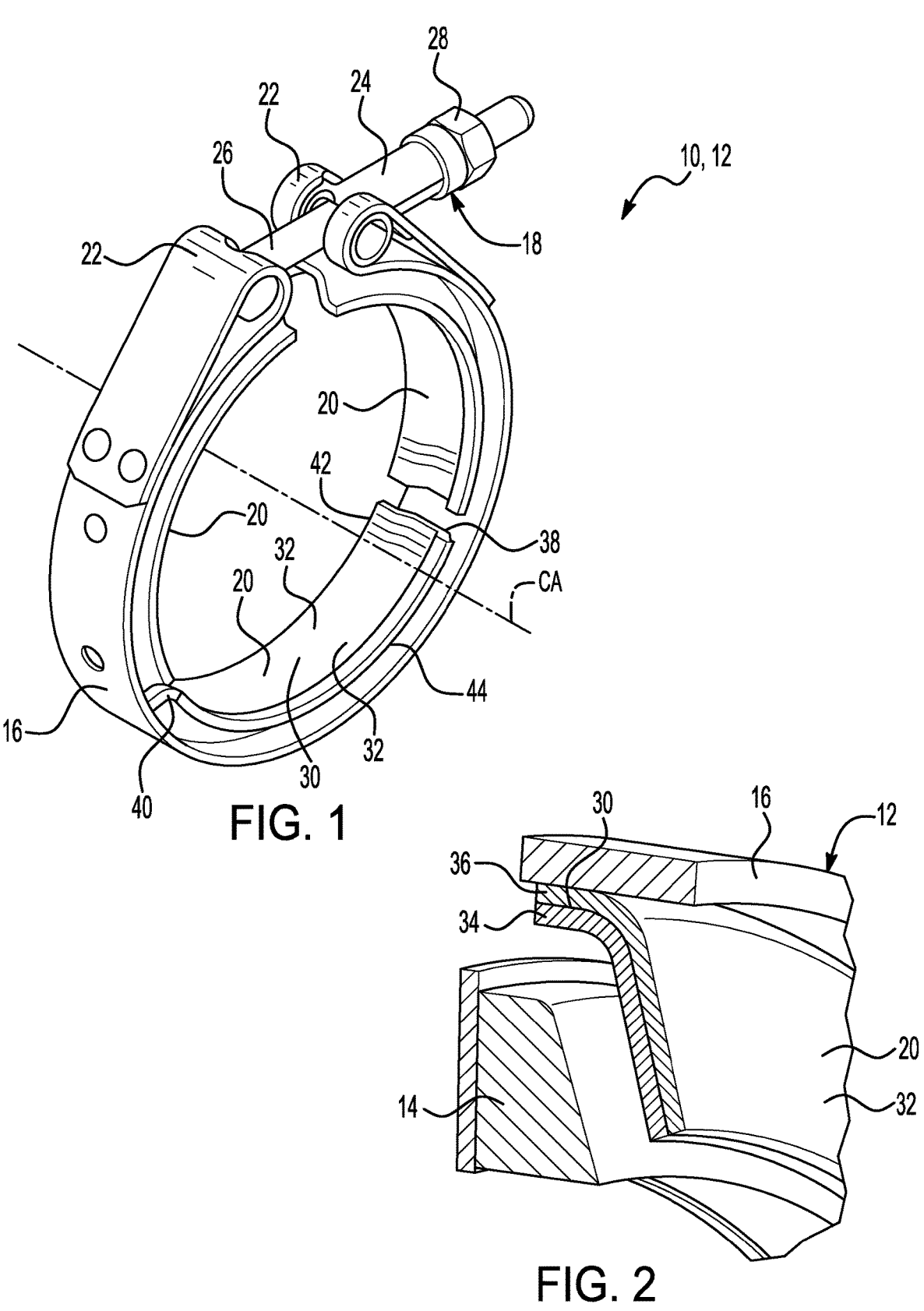
FIG. 1 is a perspective view of an embodiment of a clamp.
FIG. 2 is an enlarged, sectional view of the clamp and flange.

With particular reference now to FIGS. 1 and 2, the clamp 10 is presented as an example v-insert clamp 12 (also known as a v-profile clamp or just v-clamp). The v-clamp 12 is set in place over and around a pair of abutting or closely abutting pipe end flanges 14 (only one shown in FIG. 2) and is tightened to assist in the establishment of a fluid-tight joint thereat. The fluid-tight joint is the result of radial and/or axial loads exerted by the v-clamp 12 to the pipe end flanges 14. In general, radial loads are the resultant forces exerted directionally generally along or parallel to a radius of the v-clamp 12, and axial loads are the resultant forces exerted directionally generally along or parallel to an axis (e.g., central axis CA) of the v-clamp 12. The pipe end flanges 14 can extend from tubular bodies such as automotive exhaust pipes and components or engine pipes and components. The v-clamp 12 can have various designs, constructions, and components in different embodiments; its particular design, construction, and components can be dictated in part or more by the application in which the v-clamp will be employed and the arrangement of the pipe end flanges in which it will be tightened down upon. In the embodiment of FIGS. 1 and 2, the v-clamp 12 includes an outer band 16, a closure mechanism 18, and multiple v-insert bands 20 (also known as v-insert segments). Still, in other embodiments, the v-clamp 12 could have more, less, and/or different components.

The outer band 16 constitutes the main structure of the v-clamp 12. The outer band 16 is conventionally composed of a metal material such as stainless steel. For installation of the closure mechanism 18, each circumferential end of the outer band 16 has a pair of loops 22. The loops 22 are established when end regions of the outer band 16 are folded back onto themselves and spot-welded in place. Openings in the outer band 16 and at the loops 22 receive parts of the closure mechanism 18, as illustrated. The closure mechanism 18 serves to bring the circumferential ends of the outer band 16 toward and away from each other in order to tighten and loosen the v-clamp 12. In this example, the closure mechanism 18 is a T-bolt type latch assembly and includes a trunnion 24, a bolt or fastener 26, and a nut 28. Still, the closure mechanism 18 could be of other types in other embodiments such as a nut and bolt tightening mechanism. The v-insert segments 20 are located radially underneath and inboard of the outer band 16 and, in use and installation, receive pipe end flanges of tubular bodies subject to joining, such as the pipe end flanges 14. In this example there are a total of three v-insert segments 20. The v-insert segments 20 are positioned around the circumference of the outer band 16 and are spaced apart from one another with small gaps at confronting terminal ends of neighboring v-insert segments 20. Each v-insert segment 20 has a base wall 30 and a pair of side walls 32 depending and angled therefrom. The side walls 32 establish a v-angle 46 (FIG. 4) between them. The sectional profile of the base wall 30 and side walls 32 can vary according to different embodiments and examples.

It has been observed that certain clamps can experience degraded performance—or at least unwanted consequences—at high temperatures as a result of thermal expansion. Clamps can be exposed to high temperatures during installation and use, as well as at other times. In automotive applications, for example, clamps installed near turbochargers and near engine and exhaust manifolds can heat up due to the hot gases travelling through the accompanying pipes and/or components. When heated, axal loads and/or radial loads exerted by the clamps and establishing the subject fluid-tight joint can weaken. The fluid-tight joint could hence be compromised at high temperatures and thereafter. In an example past v-clamp, multiple v-insert segments are provided and are constructed of a single layer and a single metal material. The v-insert segments are tightened down on a pair of pipe end flanges. An axial load is applied to the pipe end flanges, and a v-angle is established between side walls of the v-insert segments. Increased temperatures at the v-insert segments have been observed to cause a widening of the v-angle in certain cases, which can lead to a reduction in the applied axial load. The reduction in applied axial load has been observed even without an appreciable v-angle widening. Without intending to be limited to a particular theory of causation, it is currently thought that the widening v-angle and reduced axial load are due at least in part to thermal expansion of the single layer and single metal material.

A bi-metallic construction at clamp bands has been found to resolve or at least mitigate these drawbacks, should they tend to occur. The bi-metallic construction provides metal layers with differing coefficients of thermal expansion. The metal layers can be arranged and positioned relative to each other in order to impart desired behavior—or at least mitigate unwanted consequences—of the clamp bands at high temperatures. An enhanced level of control and management of the exerted axial loads and/or radial loads is hence furnished. The bi-metallic construction can be applied to various types of clamp bands and can take different forms in different embodiments.

In the embodiment of FIG. 2, the applicable clamp bands are the v-insert segments 20. Taking the single v-insert segment 20 shown in FIG. 2 as an example, it includes a first metal layer 34 and a second metal layer 36. Here, the v-insert segments 20 can be readily subjected to high temperatures amid use. The first and second metal layers 34, 36 constitute the bi-metallic construction in this embodiment, and constitute the sole and only metal layers in the overall construction of each v-insert segment 20; in other words, no other metal layers are provided to make-up an individual v-insert segment 20, according to this embodiment. The first and second metal layers 34, 36 are overlaid with each other. The first and second metal layers 34, 36 are laid and located upon each other, and overlap. The first metal layer 34 is situated on an inner side with respect to the central axis CA, and the second metal layer 36 is situated on an outer side with respect to the central axis CA. The first metal layer 34 hence constitutes a radially-innermost layer with respect to the second metal layer 36, and the second metal layer 36 constitutes a radially-outermost layer with respect to the first metal layer 34. Various metalworking techniques can be employed in order to effect the overlaid arrangement. In one example, the first and second metal layers 34, 36 are bonded together via a cladding process; still, other techniques can be used in other examples. Furthermore, in this embodiment the first and second metal layers 34, 36 are coextensive with each other. With reference now to FIG. 1, between a first circumferential end 38 and a second circumferential end 40 of the v-insert segments 20, the first and second metal layers 34, 36 have similar circumferential extents. And likewise, between a first axial end 42 and a second axial end 44 of the v-insert segments 20, the first and second metal layers 34, 36 could have similar extents. Moreover, the first and second layers 34, 36 can have similar radial thicknesses, as demonstrated in FIG. 2.

Figure 3:
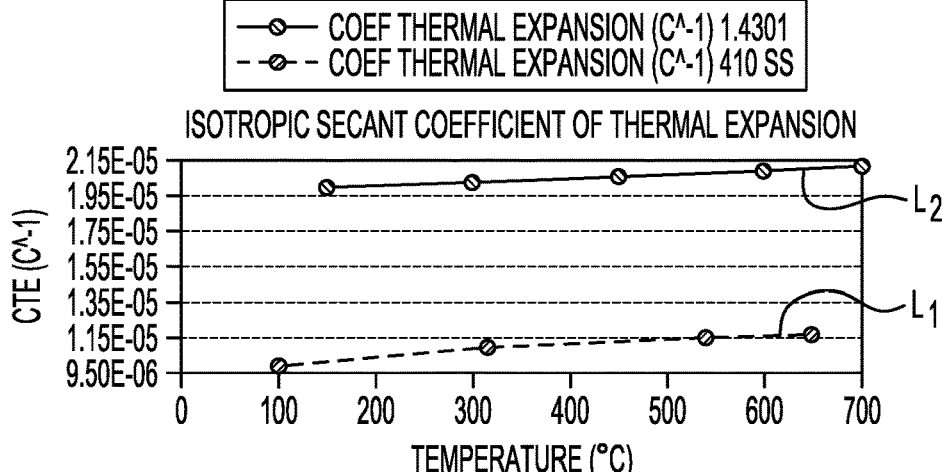
FIG. 3 is a graph of isotropic secant coefficients of thermal expansion for example types of stainless steels, presenting temperature (degrees Celsius; ° C.) on an x-axis and coefficient of thermal expansion (CTE; $C^{\wedge}-1$) on a y-axis.

The first and second metal layers 34, 36 are composed of metal materials with different coefficients of thermal expansion. The metal material compositions can differ too. In an example, the first and second metal layers 34, 36 are stainless steel materials; that is, the first metal layer 34 can also be a first stainless steel layer 34, and the second metal layer 36 an also be a second stainless steel layer 36. The first metal layer 34 is composed of a first stainless steel, particularly a martensitic stainless steel known as AISI 410 (UNS S41000), and the second metal layer 36 is composed of a second stainless steel, particularly an austenitic stainless steel known as DIN EN 1.4301 (X5CrNi18-10); still, other metal materials and other stainless steel material types can be used in other examples. The material compositions of the first and second stainless steels differ with respect to each other. The first metal layer 34 therefore possesses a first coefficient of thermal expansion property value that is less than a second coefficient of thermal expansion property of the second metal layer 36. In other words, the radially-innermost metal layer of the v-insert segment 20 has a smaller coefficient of thermal expansion than the radially-outermost metal layer of the v-insert segment 20. FIG. 3 compares the first and second coefficients of thermal expansion of the first and second metal layers 34, 36 in the example in which the first metal layer 34 is AISI 410 and the second metal layer 36 is DIN EN 1.4301. In the graph of FIG. 3, temperature in degrees Celsius (° C.) is plotted on an x-axis, and coefficient of thermal expansion (CTE; C^-1) is plotted on a y-axis. The first coefficient of thermal expansion is represented by line $L_1$ in the graph, and the second coefficient of thermal expansion is represented by line $L_2$ in the graph. As demonstrated, the first coefficient of thermal expansion has a lower value compared to the second coefficient of thermal expansion over the temperature range depicted.

Figure 4:
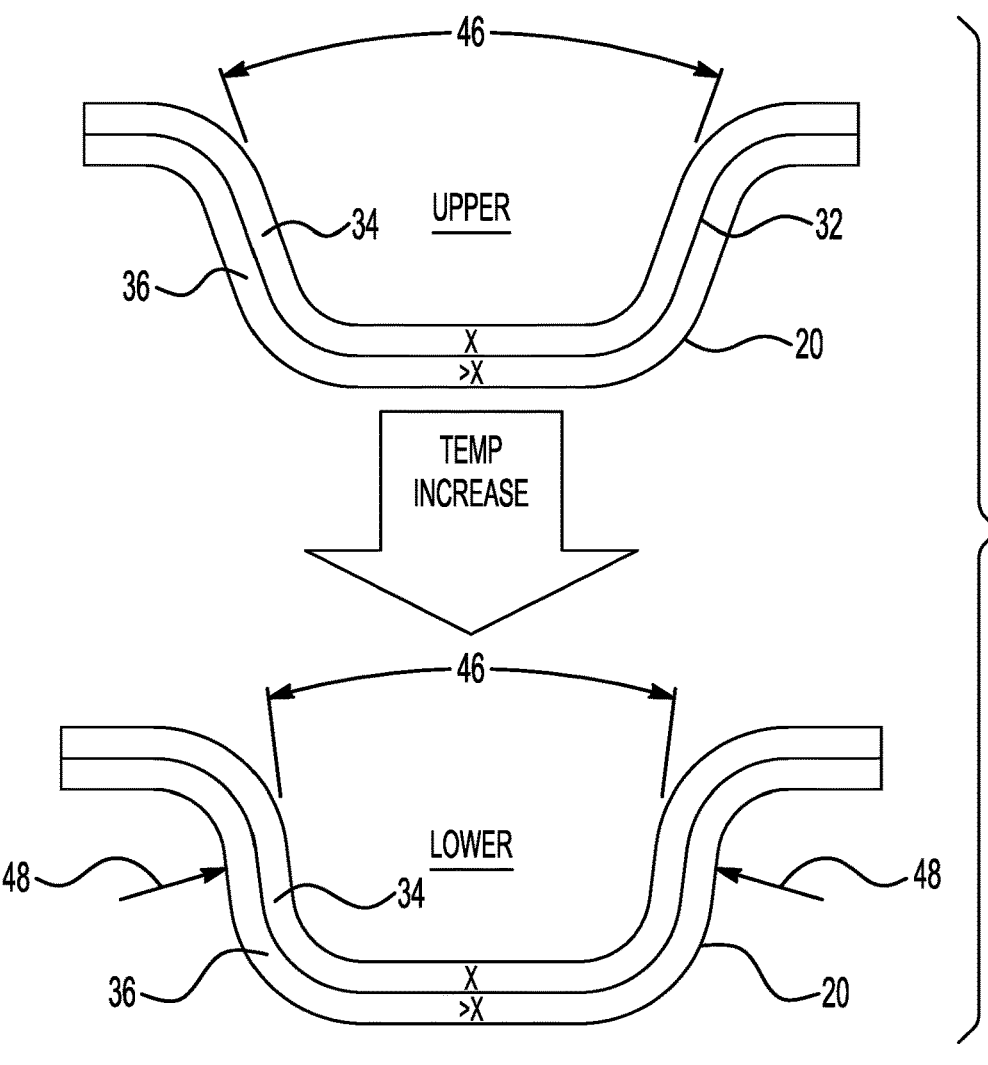
FIG. 4 is a schematic view of the clamp and its behavior according to one embodiment of metal layers upon experiencing increased temperatures.

With reference now to FIG. 4, a schematic representation and demonstration of the behavior of an embodiment of the v-insert segments 20 upon experiencing increased temperatures is presented; not all embodiments will necessarily behave as depicted. In FIG. 4, a single v-insert segment 20 is shown in representational view and isolated without the outer band 16 and other components for demonstrative purposes. The v-insert segment 20 has the first metal layer 34 and the second metal layer 36. The first metal layer 34 in this example is made of a steel material that exhibits a first coefficient of thermal expansion (X). The second metal layer 36 in this example is similarly made of a steel material, but exhibits a second coefficient of thermal expansion with a value greater than that of the first coefficient of thermal expansion (>X). In this demonstration, the v-insert segment 20 and its side walls 32 establish the v-angle 46 of approximately forty degrees (40°) at a non-elevated temperature (e.g., 22° C.)—this is illustrated by the upper depiction in FIG. 4 (UPPER). Upon experiencing a temperature increase such as during certain working conditions of up to 700° C., the v-angle 46 is shown in the demonstration as decreasing to less than forty degrees (<40°), as illustrated by the lower depiction in FIG. 4 (LOWER). The v-angle 46 undergoes a change in value. The attendant axial loads exerted by the v-clamp 12 to the pipe end flanges 14 may increase or at least decrease to a lesser extent compared to such a decrease in past single-layer and single-metal v-clamps. Without intending to be limited to a particular theory of causation, it is currently thought that this reduction in angle may be caused at least in part by the second metal layer 36, with its greater coefficient of thermal expansion, pushing the first metal layer 34 axially and radially inboard, as indicated by arrows 48 in the lower depiction in FIG. 4. This demonstrated behavior may be beneficial in application, and at post-assembly and post-installation.

Figures 5, 6:
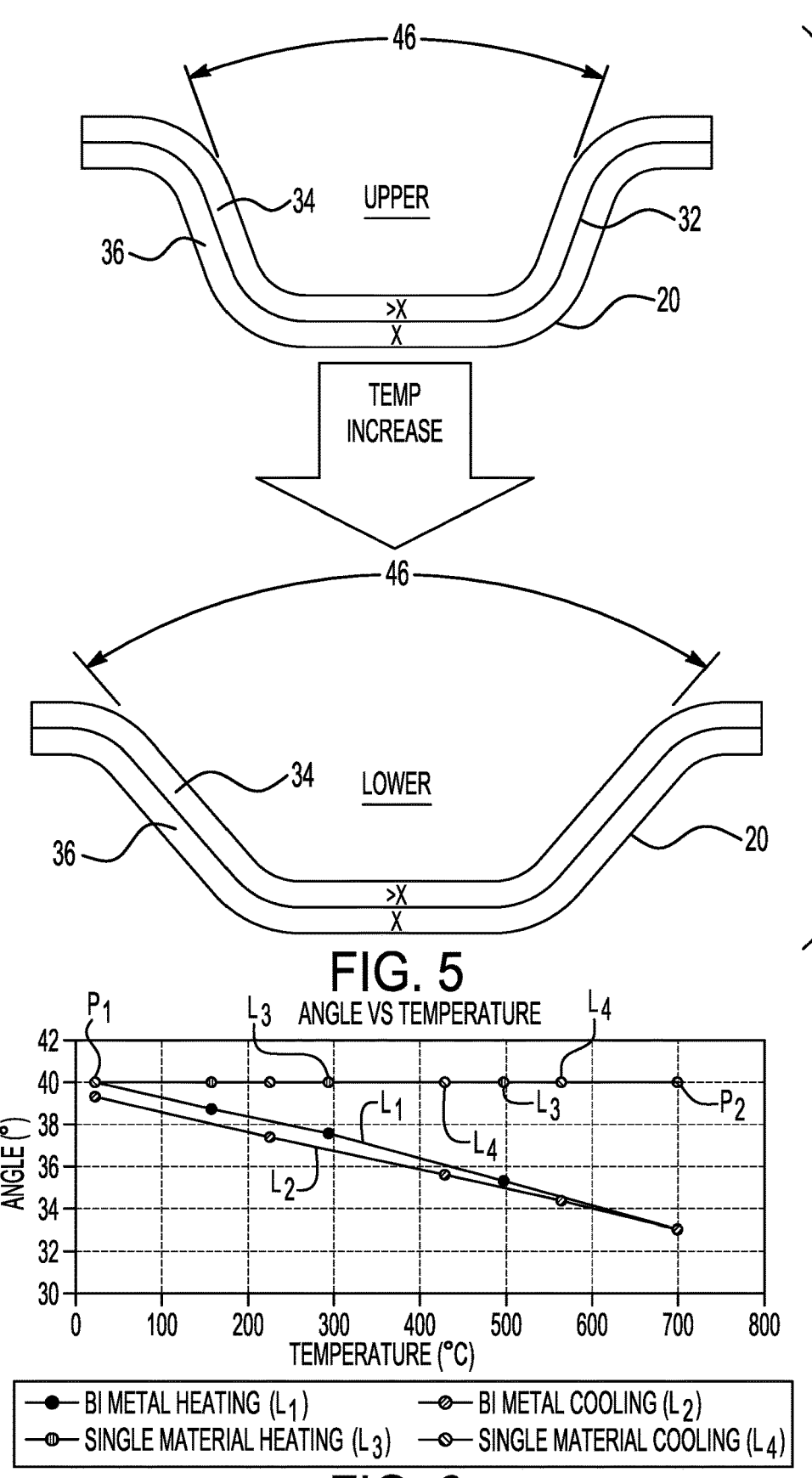
FIG. 5 is a schematic view of the clamp and its behavior according to another embodiment of metal layers upon experiencing increased temperatures.
FIG. 6 is a graph of simulation results, presenting temperature (degrees Celsius; ° C.) on an x-axis and angle (degrees; °) on a y-axis.

With reference now to FIG. 5, another schematic representation and demonstration of behavior of another embodiment of the v-insert segments 20 upon experiencing increased temperatures is presented; not all embodiments will necessarily behave as depicted. In this embodiment, and in contrast to that of FIG. 4, the first metal layer 34 is made of a steel material that exhibits a first coefficient of thermal expansion (>X) with a value greater than that of a second coefficient of thermal expansion (X) of the second metal layer 36. Here, and as before, the v-insert segment 20 and its side walls 32 establish the v-angle 46 of approximately forty degrees (40°) at a non-elevated temperature (e.g., 22° C.), as illustrated by the upper depiction in FIG. 5 (UPPER). Upon experiencing a temperature increase such as during certain working conditions of up to 700° C., the v-angle 46 is shown in the demonstration as increasing to greater than forty degrees (>40°), as illustrated by the lower depiction in FIG. 5 (LOWER). The v-angle 46 undergoes a change in value. Stress that may otherwise arise in the midst of assembly and installation of the v-clamp 12 on the pipe end flanges 14 is thereby reduced. This behavior may be beneficial in assembly and installation.

Simulations were prepared and performed in order to observe the behavior of a v-clamp and v-insert segments like that depicted in FIG. 2 with the bi-metallic construction of the first and second metal layers 34, 36 compared to the behavior of a single-layer and single-metal v-clamp and v-insert segments of past constructions. The finite element method (FEM) was utilized via the simulation software ANSYS Static Structural 2020 R2 to yield the simulation results of the graphs of FIGS. 6-8; still, other simulations may yield other results. FIG. 6 demonstrates a reduced w-angle of the bi-metallic construction over the temperature range depicted versus that of a single-layer and single-metal v-clamp. The single-layer/single-metal v-clamp subject to simulation had v-insert segments composed wholly of the austenitic stainless steel DIN EN 1.4301, and therefore possessed its accompanying coefficient of thermal expansion. In the graph of FIG. 6, temperature in degrees Celsius (° C.) is plotted on an x-axis and angle in degrees (°) of the associated v-angle (e.g., v-angle 46) is plotted on a y-axis.

The temperature range observed was from an initial 22° C. at point $P_1$, to a maximum of 700° C. at point $P_2$. The temperature range was intended to encompass the temperatures experienced by pipe end flanges, and hence clamp bands, amid use in certain automotive applications. Heating of the bi-metallic construction is represented by line $L_1$ in the graph, while cooling of the bi-metallic construction is represented by line $L_2$ in the graph. In a similar way, heating of the single-layer/single-metal construction is represented by line $L_3$ in the graph, while cooling of the single-layer/single-metal construction is represented by line $L_4$ in the graph (the lines largely overlap and coincide in the graph and thus are not readily differentiated). As demonstrated, the bi-metallic construction has a reduction in V-angle greater than that of the single-layer/single-metal construction. From 22° C. to 700° C., the angle of the associated v-angle (e.g., v-angle 46) of the bi-metallic construction migrates and decreases from 40° to 33°, as evidenced by line $L_1$. Conversely, from 700° C. to 22° C., the angle of the associated v-angle of the bi-metallic construction migrates and increases from 33° to 39.3°, as shown by line $L_2$. Without intending to be limited to a particular theory of causation, it is currently believed that the lack of full recovery of the angle of the associated v-angle of the bi-metallic construction at cooling (i.e., line $L_2$) may be due at least in part to plastic strain exhibited by the materials in this simulation. For the single-layer/single-metal construction, the angle of its v-angle remains unchanged from 22° C. to 700° C., as well as from 700° C. to 22° C., as shown by lines $L_3$ and $L_4$.

Figure 7:
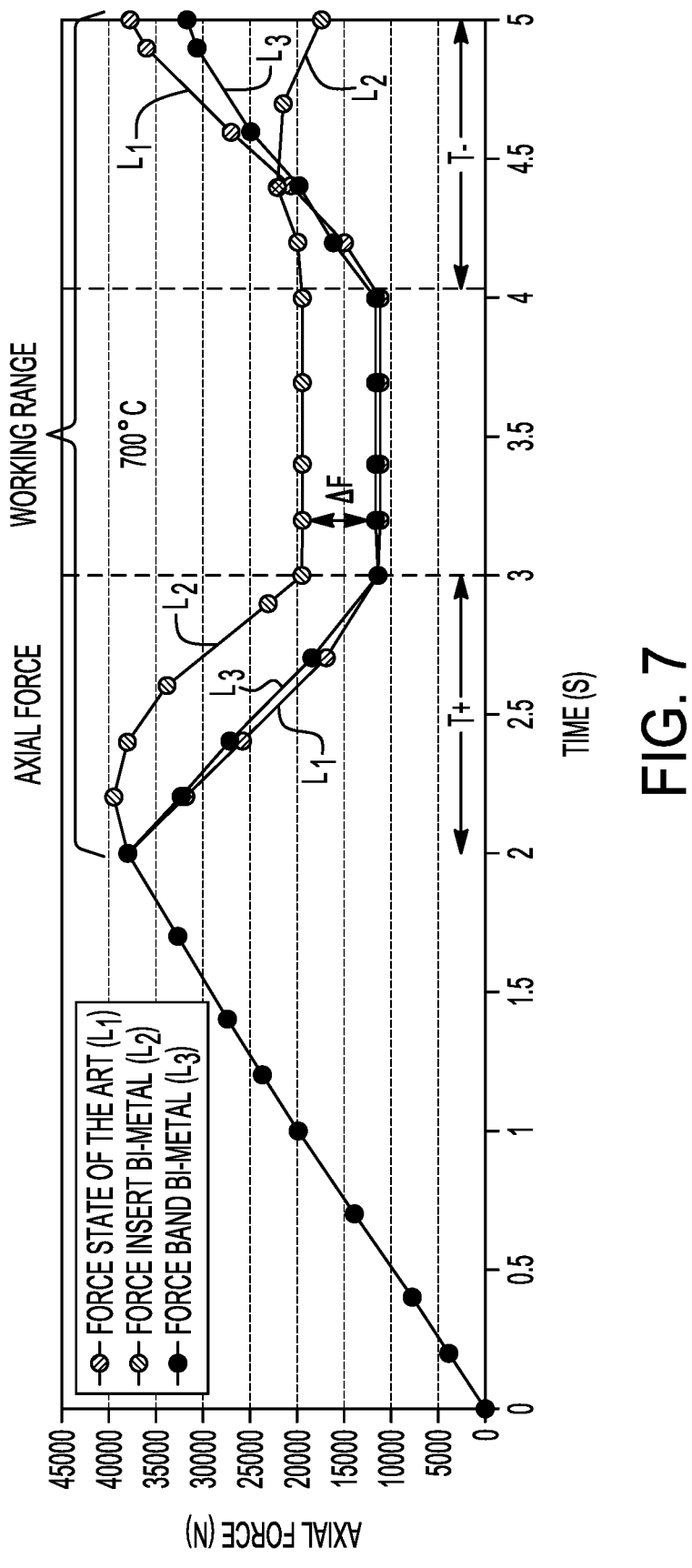
FIG. 7 is a graph of simulation results, presenting time (seconds; s) on an x-axis and axial force (Newtons; N) on a y-axis.

FIG. 7 demonstrates a greater axial force (i.e., axial load) exerted by the v-insert segments with the bi-metallic construction at the working temperature range depicted versus that of a single-layer and single-metal v-clamp. Put another way, the axial force of the bi-metallic construction decreases to a lesser extent versus that of the single-layer/single-metal construction at the working temperature range. As before, the single-layer/single-metal v-clamp in this simulation had v-insert segments composed wholly of the austenitic stainless steel DIN EN 1.4301, and therefore possessed its accompanying coefficient of thermal expansion. In the graph of FIG. 7, time in seconds (s) is plotted on an x-axis, and axial force in newtons (N) is plotted on a y-axis. The working temperature range was intended to encompass the temperatures experienced by pipe end flanges, and hence v-insert segments, amid use in certain automotive applications. From time 0 s to 2 s, the temperature remained constant at 22° C.; in other words, no increase of temperature was simulated at the v-insert segments. From time 2 s to 3 s, the temperature increased steadily from 22° C. to 700° C. (T+). From time 3 s to 4 s, the temperature remained at an increased temperature of 700° C., as indicated by the vertical broken lines in the graph. Lastly, from time 4 s to 5 s, the temperature decreased steadily from 700° C. to 22° C. (T−). Line $L_1$ in the graph represents the axial force of the single-layer/single-metal construction; line $L_2$ represents the axial force of the bi-metallic construction of the v-insert segments; and line $L_3$ represents the axial force of the bi-metallic construction of the v-clamp's outer band (e.g., outer band 16). As demonstrated, once increased temperature is applied at 2 s, the axial force exerted by the bi-metallic construction of the v-insert segments (i.e., line $L_2$) is higher compared to the axial force exerted by the single-layer/single-metal construction (i.e., line $L_1$), and is higher than the axial force exerted by the bi-metallic constriction of the v-clamp's outer band (i.e., line $L_3$). Indeed, the axial force of the bi-metallic construction of the v-insert segments is higher by 8,200 N (ΔF) between 3 s and 4 s at 700° C.

compared to the axial force of the single-layer/single-metal construction and compared to the axial force of the bi-metallic construction of the v-clamp's outer band. Finally, from time 4 s to 5 s, and when the temperature steadily decreases, the axial force of the bi-metallic construction of the v-insert segments increases slightly and then decreases slightly, as shown by line $L_2$—without intending to be limited to a particular theory of causation, it is currently believed that this behavior may be due at least in part to plastic strain exhibited by the materials in this simulation.

Figure 8:
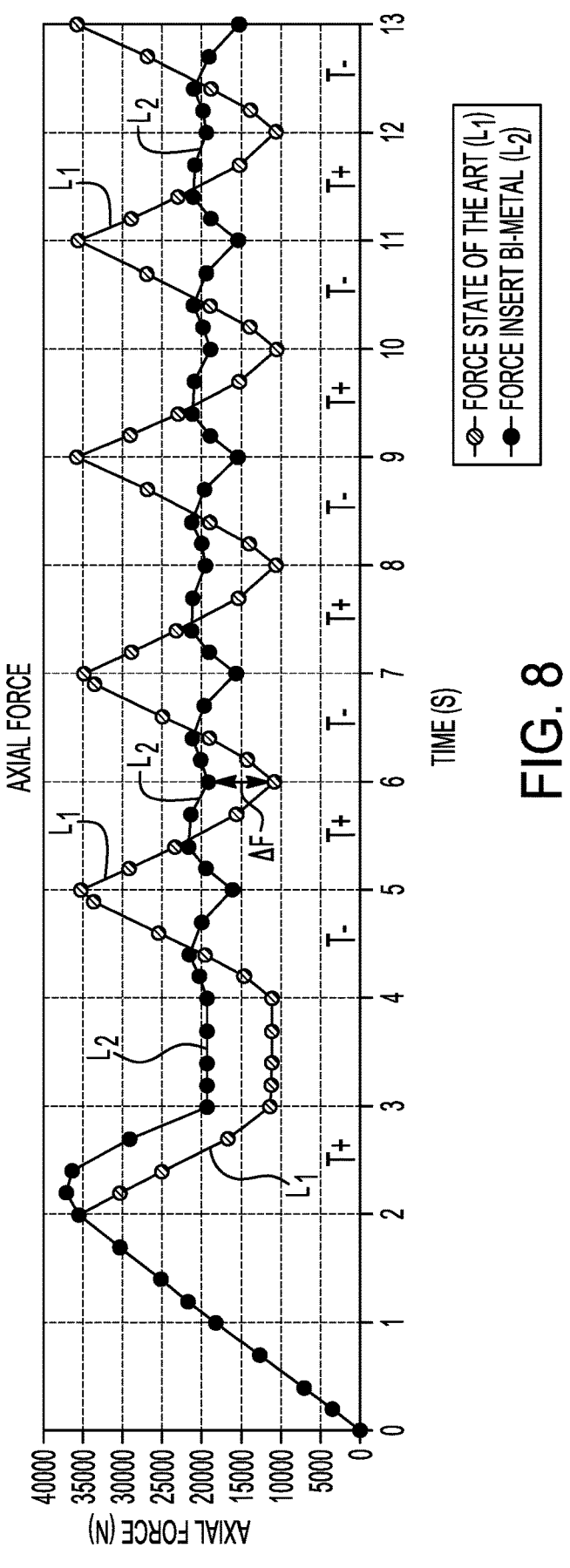
FIG. 8 is a graph of simulation results, presenting time (seconds; s) on an x-axis and axial force (Newtons; N) on a y-axis.

With reference now to FIG. 8, it shows greater axial forces (i.e., axial loads) exerted by the v-insert segments with the bi-metallic construction at the working temperatures of the five thermal cycles depicted versus those of a single-layer and single-metal v-clamp. Put another way, the axial forces of the bi-metallic construction decreases to a lesser extent versus those of the single-layer/single-metal construction at the working temperatures of the five thermal cycles depicted. As before, the single-layer/single-metal v-clamp in this simulation had v-insert segments composed wholly of the austenitic stainless steel DIN EN 1.4301, and therefore possessed its accompanying coefficient of thermal expansion. In the graph of FIG. 8, time in seconds (s) is plotted on an x-axis and axial force in newtons (N) is plotted on a y-axis.

The working temperature ranges and the five thermal cycles in FIG. 8 were intended to replicate the conditions experienced by pipe end flanges, and hence v-insert segments, amid use in certain automotive applications. From time 0 s to 2 s, the temperature remained constant at 22° C.; from time 2 s to 3 s, the temperature increased steadily from 22° C. to 700° C. (T+); from time 3 s to 4 s, the temperature remained at an increased temperature of 700° C.; from time 4 s to 5 s, the temperature decreased steadily from 700° C. to 22° C. (T−); from time 5 s to 6 s, the temperature increased steadily from 22° C. to 700° C. (T+); from time 6 s to 7 s, the temperature decreased steadily from 700° C. to 22° C. (T−); from time 7 s to 8 s, the temperature increased steadily from 22° C. to 700° C. (T+); from time 8 s to 9 s, the temperature decreased steadily from 700° C. to 22° C. (T−); from time 9 s to 10 s, the temperature increased steadily from 22° C. to 700° C. (T+); from time 10 s to 11 s, the temperature decreased steadily from 700° C. to 22° C. (T−); from time 11 s to 12 s, the temperature increased steadily from 22° C. to 700° C. (T+); and from time 12 s to 13 s, the temperature decreased steadily from 700° C. to 22° C. (T−).

Line $L_1$ in the graph of FIG. 8 represents the axial force of the single-layer/single-metal construction, and line $L_2$ in the graph represents the axial force of the bi-metallic construction of the v-insert segments. As demonstrated, once increased temperature is applied at 2 s, the axial force exerted by the bi-metallic construction of the v-insert segments is higher compared to the axial force exerted by the single-layer/single-metal construction. Indeed, the axial force of the bi-metallic construction of the v-insert segments is higher by 8,200 N between 3 s and 4 s at 700° C. compared to the axial force of the single-layer/single-metal construction. This first thermal cycle from time 2 s to 5 s yielded the largest impact on axial force behavior of the bi-metallic construction of the v-insert segments in this simulation. During the second thermal cycle from time 5 s to 7 s, the axial force of the bi-metallic construction of the v-insert segments is higher by 8,200 N (ΔF) at time 6 s at 700° C. compared to the axial force of the single-layer/single-metal construction. This higher axial force of 8,200 N remains true during the third thermal cycle from time 7 s to 9 s and at time 8 s, during the fourth thermal cycle from time 9 s to 11 s and at time 10 s, and during the fifth thermal cycle from time 11 s to 13 s and at time 12 s. Over all five thermal cycles in the simulation, the bi-metallic construction of the v-insert segments demonstrated less variation in axial force compared to the axial force variations of the single-layer/single-metal construction. Moreover, although the axial force of the bi-metallic construction of the v-insert segments is lower than that of the single-layer/single-metal construction at the baseline temperature of 22° C. after the first thermal cycle (i.e., at times 5 s, 7 s, 9 s, and 11 s), the axial force of the bi-metallic construction remains higher than that of the single-layer/single-metal construction at the maximum temperature of 700° C.

Moreover, it is thought that the bi-metallic construction could resolve or at least mitigate the occurrence of an undesired phenomenon commonly referred to as yield strength creep. The creep phenomenon is often described as a type of metal deformation in which metals subjected to high heat and high loads can plastically deform below the yield strengths otherwise possessed by the metals. In certain automotive applications, for instance, clamp bands of metal can experience high heat from hot gases travelling through the accompanying pipes and/or components, and can experience high loads from increased pressures at the accompanying joints. These conditions have been observed to bring about yield strength creep in metal clamp bands. It is currently thought, since the first and second metal layers 34, 36 can be composed of differing metal materials with varying coefficients of thermal expansion, that the bi-metallic construction may serve to mitigate or altogether resolve creep occurrence in the clamp 10.

Figure 9:
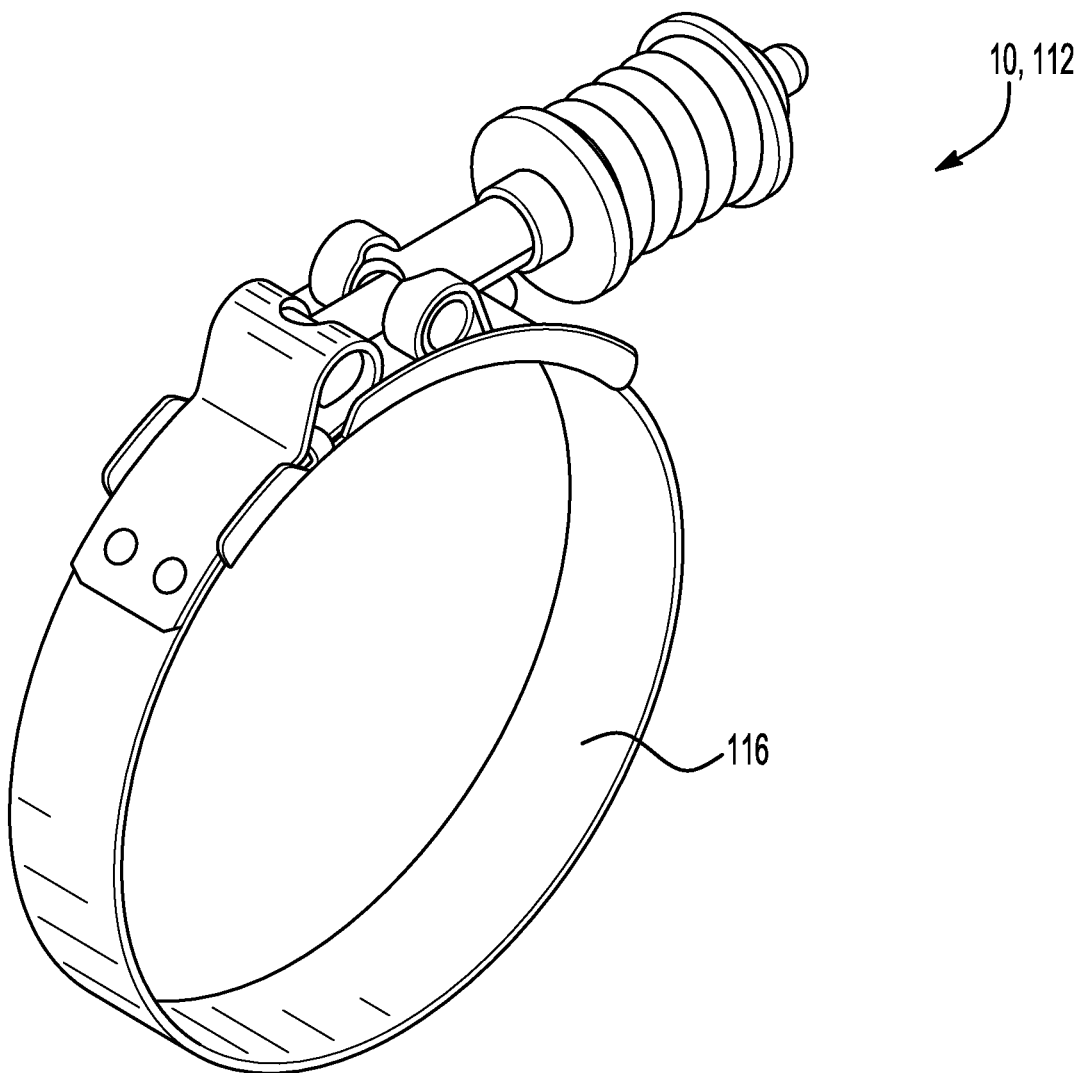
FIG. 9 is a perspective view of another embodiment of a clamp.

Still, other embodiments can implement the bi-metallic construction in varying ways. In the example of the v-clamp 12 of FIG. 2, for instance, the outer band 16 could also exhibit the bi-metallic construction and could hence have a first and second metal layer as described. The bi-metallic construction of the outer band 16 could be in addition to the bi-metallic construction of the v-insert segments 20. With reference now to FIG. 9, the clamp 10 is presented as an example pipe or hose clamp 112. A flat band 116 in this example could exhibit the bi-metallic construction and could hence have a first metal layer and a second metal layer as described.

As used herein, the terms "general" and "generally" and "substantially" are intended to account for the inherent degree of variance and imprecision that is often attributed to, and often accompanies, any design and manufacturing process, including engineering tolerances, and without deviation from the relevant functionality and intended outcome, such that mathematical precision and exactitude is not implied and, in some instances, is not possible.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A clamp, comprising:
   a closure mechanism having a bolt; and
   a band having a bi-metallic construction with a first metal layer and a second metal layer, said first metal layer and said second metal layer overlaid on each other and bonded together, said first metal layer possessing a first coefficient of thermal expansion and said second metal layer possessing a second coefficient of thermal expansion, said first coefficient of thermal expansion differing in value with respect to said second coefficient of thermal expansion;
   wherein said first and second metal layers are coextensive relative to each other and with respect to their circumferential extents and with respect to their axial extents.

2. The clamp as set forth in claim 1, wherein the clamp is a v-insert clamp or a pipe clamp.

3. The clamp as set forth in claim 1, wherein said band is a v-insert band or a flat band.

4. The clamp as set forth in claim 1, wherein said first metal layer is a radially-innermost layer relative to said second metal layer, and said first coefficient of thermal expansion is greater than said second coefficient of thermal expansion.

5. The clamp as set forth in claim 1, wherein said first metal layer is a radially-innermost layer relative to said second metal layer, and said first coefficient of thermal expansion is less than said second coefficient of thermal expansion.

6. The clamp as set forth in claim 1, wherein the clamp is a v-insert clamp and said band is a v-insert band, said first metal layer is a radially-innermost layer relative to said second metal layer, said first coefficient of thermal expansion is greater than said second coefficient of thermal expansion, and wherein, upon an increase of temperature at said v-insert band, a v-angle established at said v-insert band decreases in value.

7. The clamp as set forth in claim 1, wherein the clamp is a v-insert clamp and said band is a v-insert band, said first metal layer is a radially-innermost layer relative to said second metal layer, said first coefficient of thermal expansion is less than said second coefficient of thermal expansion, and wherein, upon an increase of temperature at said v-insert band, a v-angle established at said v-insert band increases in value.

8. The clamp as set forth in claim 1, wherein said first and second metal layers constitute the sole metal layers of said band.

9. The clamp as set forth in claim 1, wherein said first metal layer is composed of a first stainless steel, and said second metal layer is composed of a second stainless steel, the first and second stainless steels possessing material compositions that differ with respect to each other.

10. The clamp as set forth in claim 1, wherein the clamp is a v-insert clamp and said band is a v-insert band, said first metal layer is a first stainless steel layer and said second metal layer is a second stainless steel layer, said first stainless steel layer is a radially-innermost layer with respect to said second stainless steel layer, said first coefficient of thermal expansion is greater than said second coefficient of thermal expansion, and wherein, upon an increase in temperature of up to 700° C. at said v-insert band, a v-angle established at said v-insert band decreases to less than forty degrees (<40°).

11. The clamp as set forth in claim 1, wherein the clamp is a v-insert clamp and said band is a v-insert band, said first metal layer is a first stainless steel layer and said second metal layer is a second stainless steel layer, said first stainless steel layer is a radially-innermost layer with respect to said second stainless steel layer, said first coefficient of thermal expansion is less than said second coefficient of thermal expansion, and wherein, upon an increase in temperature of up to 700° C. at said v-insert band, a v-angle established at said v-insert band increases to greater than forty degrees (>40°).

12. The clamp as set forth in claim 1, wherein the clamp is a v-insert clamp and said band is a v-insert band, said v-insert band having a base wall and a pair of side walls depending and angled from said base wall, said pair of side walls establishing a v-angle.

13. A v-insert clamp, comprising:
a closure mechanism having a bolt; and
a v-insert band having a bi-metallic construction with a first stainless steel layer and a second stainless steel layer, said first stainless steel layer and said second stainless steel layer overlaid on each other and bonded together, said first stainless steel layer and said second stainless steel layer constituting the sole stainless steel layers of said v-insert band, wherein said first stainless steel layer and said second stainless steel layer are coextensive relative to each other and with respect to their circumferential extents and with respect to their axial extents, said first stainless steel layer possessing a first coefficient of thermal expansion and said second stainless steel layer possessing a second coefficient of thermal expansion, said first coefficient of thermal expansion differing in value with respect to said second coefficient of thermal expansion, said v-insert band having a pair of side walls, said v-insert band and said pair of side walls establishing a v-angle;
wherein, upon an increase of temperature at said v-insert band, said v-angle undergoing a change in value.

14. The v-insert clamp as set forth in claim 13, wherein said first stainless steel layer is a radially-innermost layer relative to said second stainless steel layer, said first coefficient of thermal expansion is greater than said second coefficient of thermal expansion, and the change in value of said v-angle is constituted by a decrease in value of said v-angle upon the increase in temperature.

15. The v-insert clamp as set forth in claim 13, wherein said first stainless steel layer is a radially-innermost layer relative to said second stainless steel layer, said first coefficient of thermal expansion is less than said second coefficient of thermal expansion, and the change in value of said v-angle is constituted by an increase in value of said v-angle upon the increase in temperature.

16. The v-insert clamp as set forth in claim 13, wherein said first stainless steel layer and said second stainless steel layer possessing material compositions that differ with respect to each other.

17. A v-insert clamp, comprising:
a closure mechanism having a bolt; and
a v-insert band having a bi-metallic construction with a first stainless steel layer and a second stainless steel layer, said first stainless steel layer and said second stainless steel layer possessing material compositions that differ with respect to each other, said first stainless steel layer and said second stainless steel layer overlaid on each other and bonded together, said first stainless steel layer and said second stainless steel layer constituting the sole stainless steel layers of said v-insert band, wherein said first stainless steel layer and said second stainless steel layer are coextensive relative to each other and with respect to their circumferential extents and with respect to their axial extents, said first stainless steel layer possessing a first coefficient of thermal expansion and said second stainless steel layer possessing a second coefficient of thermal expansion, said first coefficient of thermal expansion differing in value with respect to said second coefficient of thermal expansion, said v-insert band having a pair of side walls, said v-insert band and said pair of side walls establishing a v-angle;
wherein, upon an increase of temperature at said v-insert band, said v-angle undergoing a decrease in value or undergoing an increase in value.

18. The v-insert clamp as set forth in claim 17, wherein said first stainless steel layer is a radially-innermost layer relative to said second stainless steel layer, said first coefficient of thermal expansion is greater than said second coefficient of thermal expansion, and said v-angle decreasing in value to less than forty degrees (<40°) upon an increase in temperature of up to 700° C. at said v-insert band.

19. The v-insert clamp as set forth in claim 17, wherein said first stainless steel layer is a radially-innermost layer relative to said second stainless steel layer, said first coefficient of thermal expansion is less than said second coefficient of thermal expansion, and said v-angle increasing in value to greater than forty degrees (>40°) upon an increase in temperature of up to 700° C. at said v-insert band.

* * * * *